US006524361B1

(12) United States Patent
Thornton et al.

(10) Patent No.: US 6,524,361 B1
(45) Date of Patent: Feb. 25, 2003

(54) MICRO-POROUS FILTER

(75) Inventors: Gerry F. Thornton, Christiansburg, VA (US); Stephen M. Stafford, Radford, VA (US); Lewis W. Kenyon, Blacksburg, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/696,210

(22) Filed: Oct. 26, 2000

(51) Int. Cl.[7] .......................... B01D 46/10; B01D 29/05
(52) U.S. Cl. .................. 55/385.4; 55/385.1; 55/495; 55/503; 55/523; 55/524; 96/4
(58) Field of Search ................ 55/385.1, 385.4, 55/385.6, 487, 490, 495, 502, 503, 523, 524, DIG. 35; 96/4, 6, 10, 14, 45, 55, 46; 362/294, 345, 362, 364

(56) References Cited

U.S. PATENT DOCUMENTS

| 707,318 | A | | 8/1902 | Geyer et al. | |
|---|---|---|---|---|---|
| 2,400,719 | A | * | 5/1946 | Stackhouse | 55/503 |
| 2,744,523 | A | * | 5/1956 | Malcolm, Jr. et al. | 55/503 |
| 2,980,204 | A | | 4/1961 | Jordan | 183/45 |
| 3,898,063 | A | | 8/1975 | Gazan | 55/276 |
| 4,015,114 | A | * | 3/1977 | Paajanen et al. | 55/385.1 |
| 4,155,247 | A | * | 5/1979 | Kaczmarek et al. | 55/503 |
| 4,171,209 | A | | 10/1979 | Brown | 55/466 |
| 4,362,047 | A | * | 12/1982 | vonReis et al. | 55/503 |
| 4,405,974 | A | | 9/1983 | Quiogue | 362/362 |
| 4,422,861 | A | | 12/1983 | Dusza | 55/498 |
| 4,516,974 | A | * | 5/1985 | Davis | 55/385.4 |
| 4,863,499 | A | * | 9/1989 | Osendorf | 55/385.6 |
| 4,883,507 | A | * | 11/1989 | Rey et al. | 55/503 |
| 4,957,518 | A | * | 9/1990 | Brassell | 55/385.4 |
| 5,348,570 | A | * | 9/1994 | Ruppert et al. | 55/502 |
| 5,447,695 | A | * | 9/1995 | Brown et al. | 55/385.6 |
| 5,496,389 | A | * | 3/1996 | Wilcox | 55/495 |
| 5,827,340 | A | * | 10/1998 | Fiske | 55/385.6 |
| 5,891,223 | A | | 4/1999 | Shaw et al. | 96/134 |
| 5,912,369 | A | * | 6/1999 | Reeves | 55/385.6 |
| 5,914,415 | A | * | 6/1999 | Tago | 55/385.4 |
| 5,931,979 | A | * | 8/1999 | Immel | 55/385.6 |
| 6,093,230 | A | * | 7/2000 | Johnson et al. | 55/482 |
| 6,209,541 | B1 | * | 4/2001 | Wallace | 55/511 |
| 6,214,070 | B1 | * | 4/2001 | Crowder et al. | 55/385.6 |
| 6,296,691 | B1 | * | 10/2001 | Gidumal | 55/385.6 |

* cited by examiner

*Primary Examiner*—David A. Simmons
*Assistant Examiner*—Jason M. Greene
(74) *Attorney, Agent, or Firm*—Jeffrey J. Howell; Mark S. Bicks; Alfred N. Goodman

(57) ABSTRACT

A micro porous gas breather/filter assembly can be coupled to a housing of an electrical enclosure. The filter assembly has a two portion housing with the filter disposed between them. An adhesive on the filter attaches the filter to one or both portions of the housing. The filter allows gas to pass from the enclosure through the filter and to the atmosphere, but prohibits liquid from passing into the enclosure device. By filtering gases and liquids in this manner, the filter vents explosive and/or flammable gases from an electrical enclosure, while preventing liquid and other contaminants from entering the enclosure and damaging the electrical device or its wiring.

10 Claims, 6 Drawing Sheets

MICRO-POROUS FILTER

FIELD OF THE INVENTION

The present invention relates to a filter system for use in enclosure devices. More particularly, the present invention relates to a micro-porous filter system for venting a build up of explosive/flammable hydrogen gas out of an electrical enclosure, particularly, a lighting fixture.

BACKGROUND OF THE INVENTION

Many electrical enclosures, including some lighting fixtures, have a charger circuit and an emergency, back up or standby battery that produces hydrogen gas when charged. This build up of hydrogen gas may result in an inadvertent explosion or fire during opening of the enclosure.

The charging process of rechargeable batteries, such as nickel cadmium and other rechargeable batteries, can cause the electrolyte liquid chemical content of the batteries to break down and release hydrogen gas molecules into the atmosphere. Since hydrogen gas is explosive and flammable at a 1% concentration, any build up in an enclosure device is potentially hazardous.

Conventional systems for venting gas out of such enclosures have been problematic, in that any venting of the gas can result in the filter allowing liquid, or more specifically water, and other contaminants to pass therethrough. This contamination is due to the conventional venting systems generally employing a pressure release valve or mechanism. Many electrical enclosures need to be able to vent gases and still maintain a "wet location" or a "hose down" ability to satisfy important application requirements.

Conventional filter systems are disclosed in U.S. Pat. No. 707,318 to Geyer et al.; U.S. Pat. No. 2,980,204 to Jordan; U.S. Pat. No. 3,898,063 to Gazan; U.S. Pat. No. 4,171,209 to Brown; U.S. Pat. No. 4,405,974 to Quiogue; U.S. Pat. No. 4,422,861 to Dusza; and U.S. Pat. No. 5,891,223 to Shaw et al.

SUMMARY OF THE INVENTION

Accordingly, an object of the present invention is to provide a gas filter assembly that can meet a "wet location" or a "hose down" requirements.

Another object of the present invention is to provide a gas filter assembly that allows gas to pass into and out of an enclosure, while prohibiting passage of liquid and solid contaminants.

A further object of the present invention is to provide a gas filter assembly that allows gas to pass into and out of an enclosure, while prohibiting passage of liquids and solid contaminants, without the use of a valve or similar mechanism.

Yet another object of the present invention is to provide a gas filter assembly that reduces the possibility of an explosion or fire during the opening of an electrical enclosure.

Still another object of the present invention is to provide a gas filter assembly that is cost effective and easy to produce, install and maintain.

The foregoing objects are basically obtained by a gas filter assembly having a fitting with a first portion, a second portion and a housing coupling. A filter member having a peripheral portion is positioned between the first portion and the second portion. An adhesive is disposed on the peripheral portion, securing the filter member to at least one of the first portion and the second portion.

The foregoing objects are also obtained by an electrical enclosure having a fixture housing with an aperture therein. A filter member is positioned adjacent the aperture. An adhesive is disposed on a peripheral portion of the filter member and secures the filter member to the fixture housing adjacent the aperture.

By forming the gas assembly as described, the assembly will allow gas, specifically hydrogen, to vent out of an electrical enclosure, and ambient air to enter the enclosure and will prohibit liquids and other contaminants, specifically water, from passing therethrough. This structure allows the enclosure to be hosed down or be exposed to water, and simultaneously prevents possible explosions or fires.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
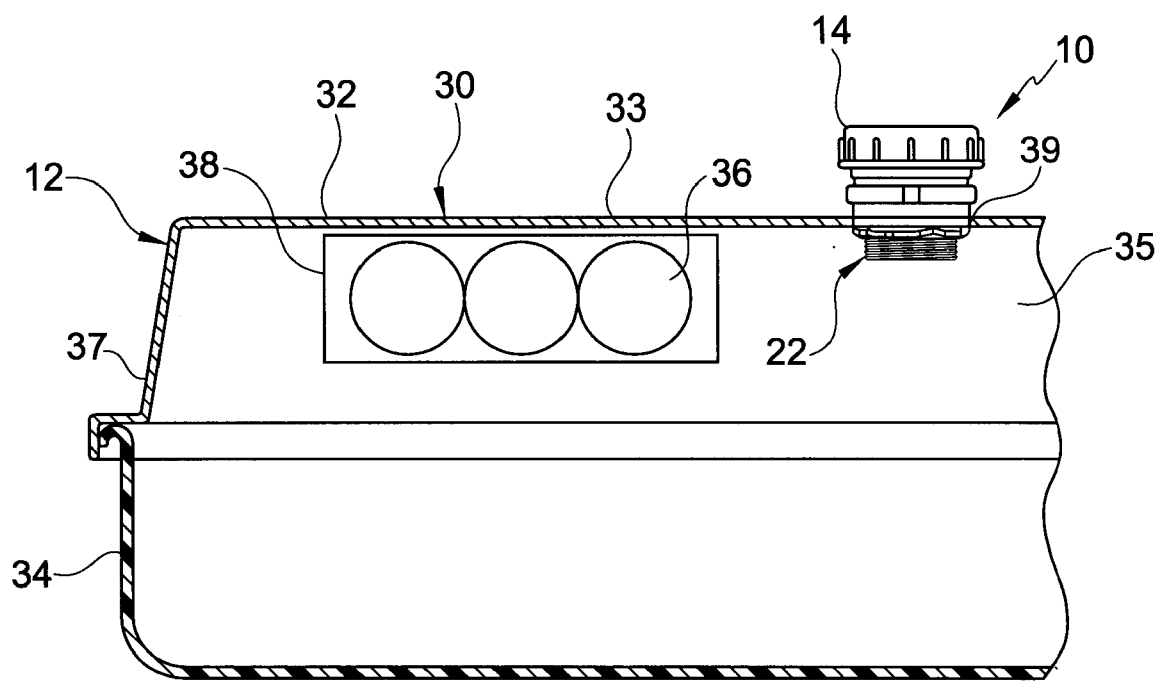
FIG. 1 is a side elevational view in section of a gas filter assembly according to a first embodiment of the present invention, received in an opening in the top of an electrical enclosure.
Figure 2:
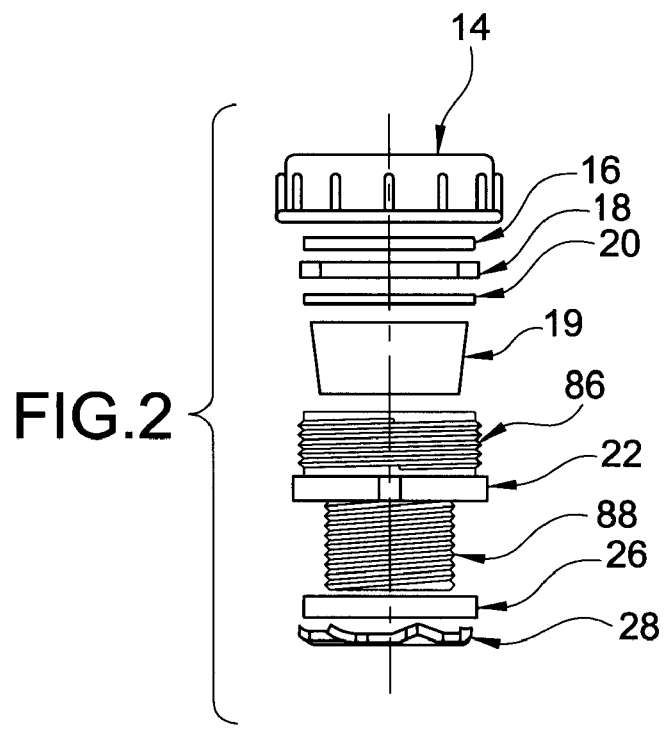
FIG. 2 is an exploded side elevational view of the gas filter assembly of FIG. 1.
Figure 3:
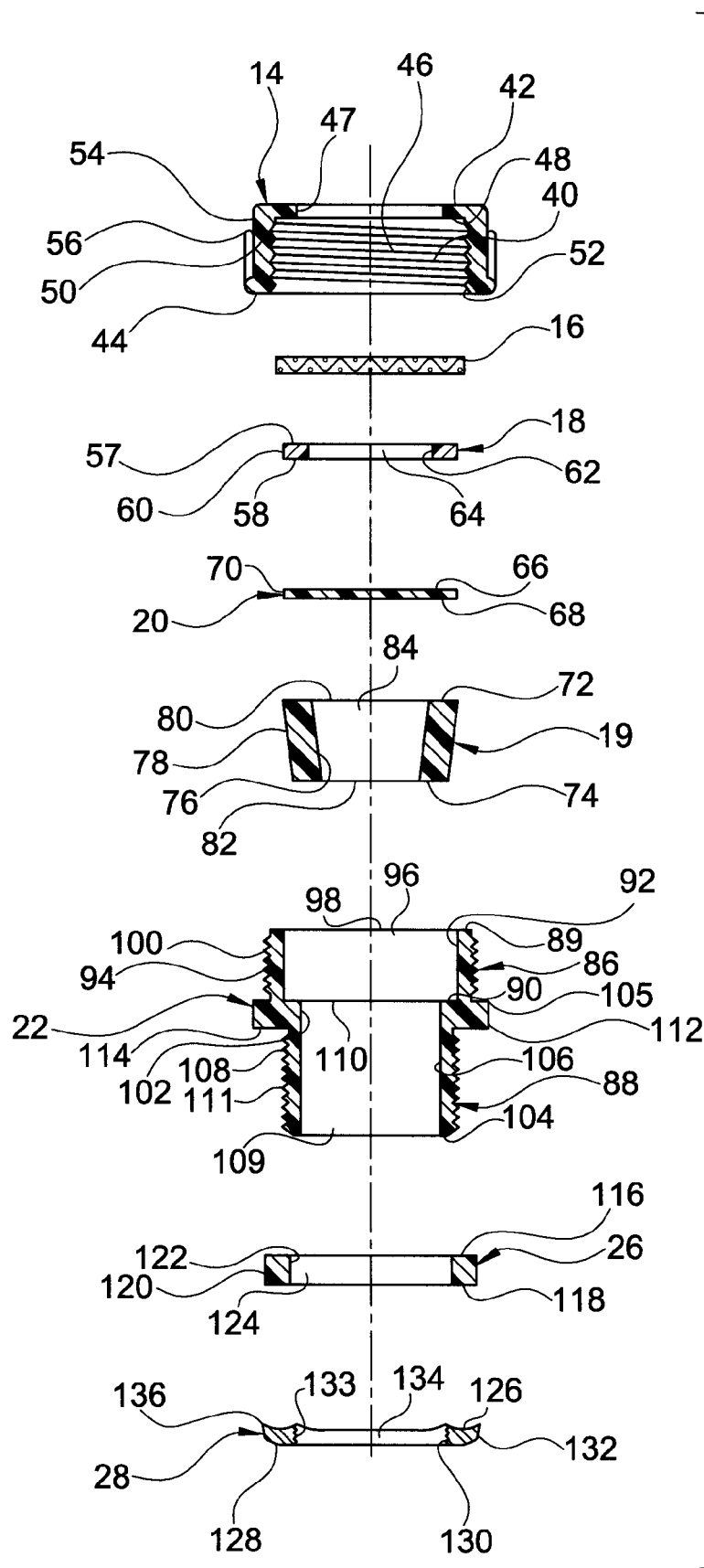
FIG. 3 is an exploded side elevational view in section of the gas filter assembly of FIG. 2.

Referring initially to FIGS. 1–3, a gas filter assembly 10 according to a first embodiment of the present invention is coupled to an electrical enclosure 12. Gas filter assembly 10 comprises a cap 14, a screen 16, a nylon gasket 18, a micro-porous filter 20 with adhesive on its peripheral portion, a bushing 19, a main fitting body 22, a gasket 26, and a conduit nut 28.

As seen in FIG. 1, electrical enclosure 12 is preferably a lighting fixture having a fixture housing 30 with an upper portion 32 and a lower portion or lens 34. However, enclosure 12 may be any electrical enclosure device; and the housing does not necessarily have to be two pieces, but may be one piece or three pieces or more. Upper portion 32 has a top portion 33, side walls 35, and end wall 37, and is preferably formed of metal.

Figure 7:
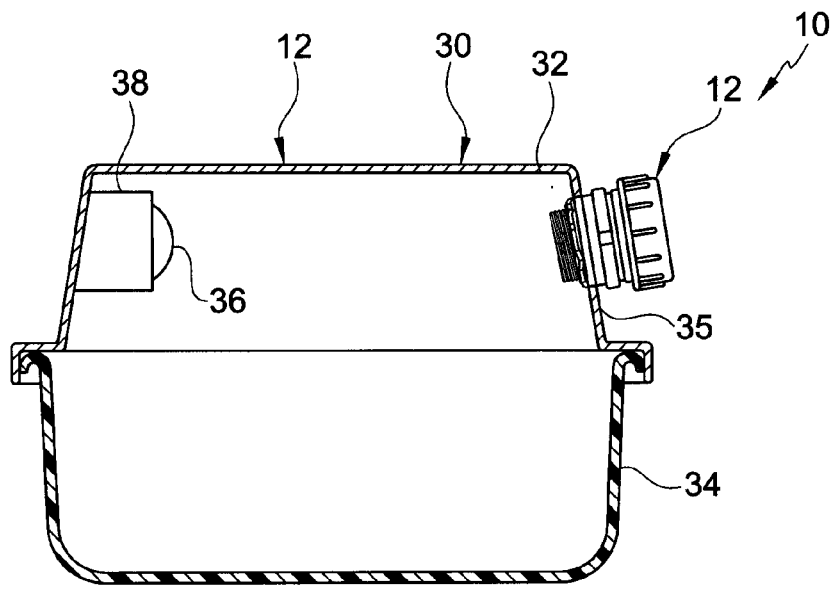
FIG. 7 is an end elevational view in section of the gas filter assembly of FIG. 4 received in an opening in a side of an electrical enclosure.
Figure 8:
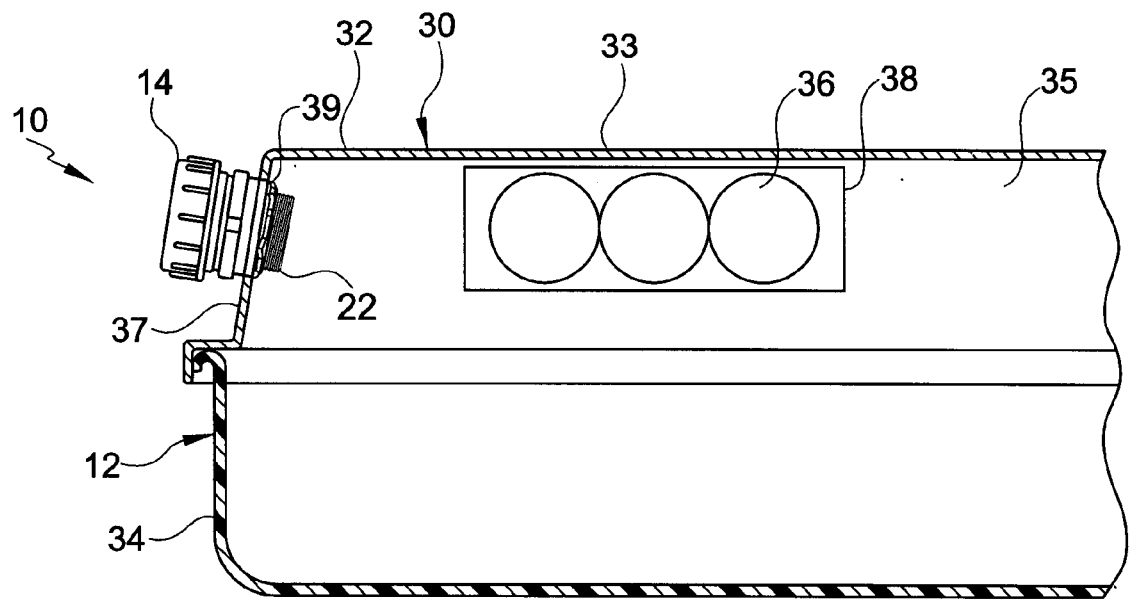
FIG. 8 is a side view in section of the gas filter assembly of FIG. 4 received in an opening in an end of an electrical enclosure.

Upper portion 32 preferably houses lighting device 36 and a rechargeable battery pack 38. Aperture 39 extends through top portion 33 of upper portion 32, as seen in FIG. 1, but can alternatively extend through any of side walls 35 or end wall 37 as shown in FIGS. 7 and 8, respectively. Aperture 39 has a diameter sufficient to allow gas filter assembly 10 to be positioned therein and may be threaded, substantially smooth or any other desirable texture.

Lower portion 34 is preferably plastic and transparent or translucent. It allows light to pass therethrough and illuminate the surrounding or adjacent area.

Lighting device 36 can be any light bulb or illumination device as is known on the art. Battery pack 38 is preferably any battery or batteries known in the art and used in conjunction with a charger circuit (not shown) and an emergency, back-up or standby battery operated lighting or ballast system.

In emergency lighting systems, hydrogen gas can build up over time as the batteries are charged, particularly during over charging. Since hydrogen gas is explosive and flammable, even at a one percent concentration, any build up in an enclosure can result in an explosion or fire, during opening, closing, or maintenance of the system.

Cap or first portion 14 (FIGS. 2–5) is preferably a hollow plastic, cylindrical fitting cap having internal screw threads 40 therein. However, cap 14 may be any material or shape that would allow it to perform the desired function and attach to main fitting body 22, for example, cap 14 may be metal, rubber or any other rigid or semi-rigid material. Cap 14 has a first side 42 and a second side 44 with a through passageway or conduit 46 therein. First side 42 has an aperture or hole 47 extending therethrough that connects through passageway 46 with the surrounding atmosphere. Aperture 47 is preferably circular and has a diameter slightly less than the diameter of passageway 46, thus creating an internal axially facing surface 48 on the cap. However, aperture 47 may be any configuration that would allow access to the interior of cap 14. Inner surface 50 defines passageway 46. Passageway 46 extends from first side 42 to second side 44, creating aperture or hole 52 at the second side. Aperture 52 has a diameter that is substantially the same as the diameter of through passageway 46. Additionally, outer surface 54 of cap 14 has protrusions 56, enhancing gripping of cap 14 for application and removal or cap 14, specifically during rotation thereof.

Screen 16 (FIGS. 2–5) is preferably a metal or plastic disc shaped mesh screen that can protect filter member 20 from harm. However, screen 16 may be any suitable material and does not necessarily have to be disc shaped and may be any configuration that would suitably cover substantially all or part of aperture 47, while simultaneously protecting filter member 20. Screen 16 is not generally suitable for filtering gas or fluid, but is more suitable for prohibiting harmful objects or solids from contacting filter member 20.

Nylon gasket 18 (FIGS. 2–4) is preferably a ring shaped resilient and flexible gasket. However, gasket 18 does not necessarily have to be ring shaped and may be any suitable shape and/or material. Gasket 18 has a first side 57, a second side 58, an exterior surface 60 and an interior surface 62. Interior surface 62 forms through passageway or aperture 64, which extends from first side 56 to second side 58. Through passageway 64 has a diameter that is substantially the same as the diameter of aperture 47. Exterior surface 60 has a diameter that is substantially similar to the diameter of passageway 46.

Filter member 20 (FIGS. 2–6) is preferably a thin disc shaped micro-porous material that has oleophobic and hydrophobic properties or qualities, thus allowing smaller gaseous molecules, such as hydrogen, to pass therethrough while simultaneously prohibiting larger liquid molecules, such as water from passing therethrough. Specifically, the filter resists passage of most water based and oil based chemicals, such as body fluids, brake fluid, lipid solutions, transmission fluid, gasoline, steering fluid, starter fluid, wiper fluid, soap solutions, and water. The filter is preferably treated, such that it has significant resistance to wetting by most, if not all, low surface tension liquids. For example, materials such as GORE-TEX, TYVEK, VERSAPOR, polypropylene, and other similar materials would be suitable.

Filter member 20 preferably has a first side 66, a second side 68 and a outer surface 70 defining an outer diameter that is substantially the same as the diameter of passageway 46. Filter member can be of any thickness or height desired between the first side and the second side, for example filter member preferably can be about 0.005 inches thick to as thick as desired or needed. Filter member 20 preferably has an adhesive 69 disposed around a peripheral portion thereof, as seen specifically in FIG. 6. Adhesive 69 may be disposed on either first side 66, second side 68, or both sides, and may be disposed completely surrounding the peripheral portion of the filter, a portion of the peripheral portion, or all of the filter on either or both sides. Adhesive 69 may be any adhesive suitable for attaching or coupling filter member 20 to plastic, metal or any other synthetic or nonsynthetic material.

Bushing 19 (FIGS. 2–4) is preferably a hollow plastic frustoconical member having a first side 72, a second side 74, an inner surface 76 and an outer surface 78. Through passageway or conduit 84 extends from hole or opening 80 in first surface 72 to hole or opening 82 in second surface 74. Inner surface 76 and outer surface 78 both taper inwardly from first side 72 to second side 74. Opening 80 defines a diameter that is substantially the same as the diameter defined by through passageway 64; and outer surface 78 at first side 72 defines a diameter that is substantially the same as the outer diameter of filter member 20.

Main fitting body or second portion 22 (FIGS. 2–4) is preferably a hollow plastic member having a first part 86 and a second part or housing coupling 88. First part 86 is preferably a circular cylinder or tube having a first end 89, a second end 90, an interior surface 92 and an exterior surface 94. Interior surface 92 defines a through passageway 96 that extends from opening 98 in first end 89 to second end 90. Exterior surface 94 preferably has threads 100 thereon and defines a diameter that is substantially similar to or slightly less than the diameter of aperture 47. However, surface 94 may be any surface that would allow it to couple, either releasably or permanently, to cap 14.

Second part 88 is preferably a hollow plastic cylinder or tube and unitary with first part 86; however, second part 88 may be any configuration and material that can be releasably coupled to first part 86 or permanently attached thereto. Second part 88 has a first end 102, a second end 104, a protrusion 105, an interior surface 106 and an exterior surface 108. Interior surface 106 defines a through passageway 109 that extends from opening 110 in first end 102 to second end 104. Through passageway 109 is connected to through passageway 96 and thereby defines a continuous passageway from first end 89 of first part 86 to second end 104 of second part 88. However, the diameter of through passageway 109 is preferably less than through passageway 96, but may have a substantially similar or a larger diameter. Exterior surface 108 preferably has threads 111 thereon. However, surface 108 may be any surface that would allow it to couple or engage, either releasably or permanently to housing 30. Protrusion 105 extends radially outwardly from the exterior surface and defines radially outwardly facing surface 112 and axially facing surface 114.

Gasket 26 (FIGS. 2–4) is preferably a ring shaped rubber or resilient gasket. Gasket 26 has a first side 116, a second side 118, an exterior surface 120 and an interior surface 122. Interior surface 122 forms through passageway or aperture 124, which extends from first side 116 to second side 118. Through passageway 124 has a diameter that is substantially the same as the diameter of aperture 47 and about the same as the diameter defined by exterior surface 108. Gasket 26 does not necessarily have to be ring shaped and may be any suitable shape and/or material.

Conduit nut 28 (FIGS. 2–4) is preferably a ring metal shaped nut having a first side 126, a second side 128, interior 130 and exterior surface 132. Interior surface 130 preferably has threads 133 and forms through passageway or aperture 134, which extends from first side 126 to second side 128. Through passageway 134 has a diameter that is substantially the same as the diameter of aperture 47 and about the same as the diameter defined by exterior surface 108. First side 126 preferably has tapered protrusions 136 extending upwardly and substantially perpendicularly therefrom. Conduit nut 28 does not necessarily have to be ring shaped and may be any suitable shape and/or material.

Assembly

Figure 4:
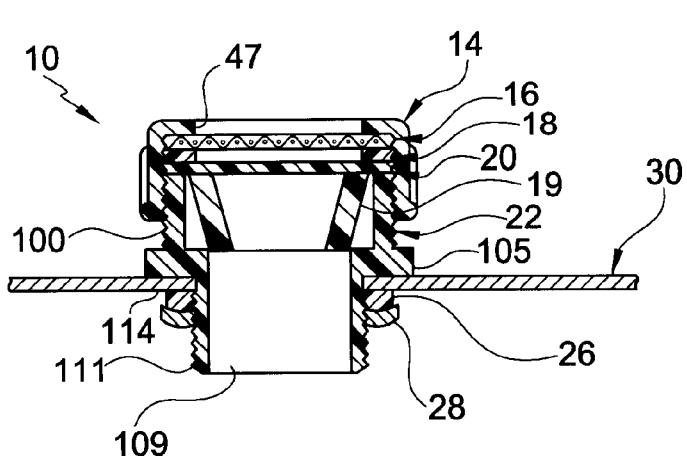
FIG. 4 is an enlarged side elevational view in section of the gas filter assembly of FIG. 1 received in an opening in an electrical enclosure.
Figure 5:
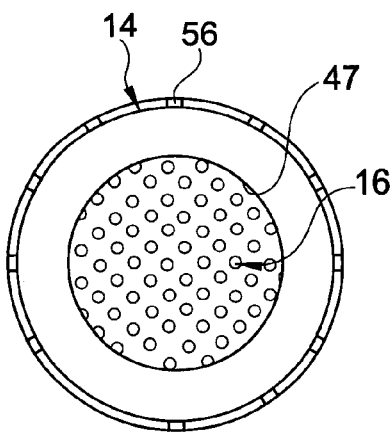
FIG. 5 is a top plan view of the gas filter assembly of FIG. 4.
Figure 6:
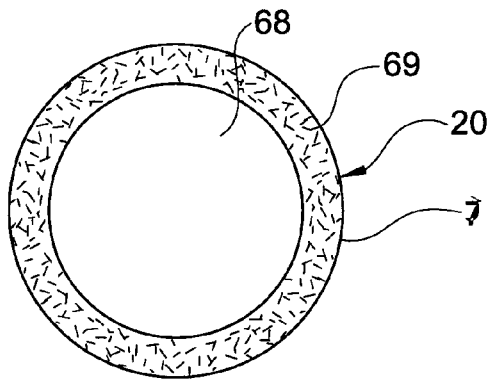
FIG. 6 is a top plan view of the filter member of FIG. 2.

As seen in FIGS. 2–4, bushing 19 can is inserted into first end 89 of the first part 86 of fitting body 22. Since outer surface 78 is tapered, second end 74 is received within opening 110 of second part 88 with surface 78 frictionally fitting against a portion of interior surface 106. First side 72 of bushing 19 is substantially planar with first end 89 of first part 86, as seen specifically in FIG. 4.

Filter member 20 is each positioned adjacent or resting on bushing first side 72, gasket 18 is then positioned adjacent filter member 20 and screen 16 is positioned adjacent gasket 18, as seen in FIGS. 3 and 4. Adhesive 69 disposed on filter member 20 then attaches filter member 20 to either the gasket 18, the bushing 19 or both, depending on the side or sides on which the adhesive is disposed, as described above.

Fitting cap 14 is positioned over screen 16 and preferably threaded onto first part 86 of main fitting body 22. Fitting cap 14 can thread to the exterior of fitting body 22 or the threads may be reversed and fitting cap 14 can thread into the interior surface of fitting body 22. Additionally, as stated above, the coupling of main fitting body 22 to fitting cap 14 can be any temporary or permanent means desirable, such as glue, snap fit, spring clip, screws or bolts. Preferably, surface 48 of cap 14 engages the outer periphery of screen 16 and applies pressure thereto, thus applying pressure to filter member 20 and gasket 18. Gasket 18 is compressed between filter member 20 and screen 16, thereby forming a fluid tight seal with fitting cap 14, so that no fluid, either gas or liquid may pass around the seal and into or out of the enclosure 12.

Second part 88 of fitting body 22 is then positioned into aperture 39 of housing 32 and can be coupled thereto using any means known in the art, such as threads, glue, or any other suitable means, or simply positioned therein with exterior surface 108 extending through aperture 39. Surface 114 of protrusion 105 is adjacent to and abuts the exterior surface of upper portion 32 of housing 30.

Gasket 26 is positioned around exterior surface 108 and adjacent or abutting the interior surface of upper portion 32 of housing 30. Interior surface 122 forms an interference fit with exterior surface 108.

Conduit nut 28 is then coupled to exterior surface 108 of second part 88, threads 133 engaging threads 100. However, conduit nut and second part do not necessarily have to be coupled together using threads and may be permanently or releasably coupled together using any desired means know in the art, such as glue, friction, or snap fit.

By coupling nut 28 and second part 88 together, gasket 26 is compressed between housing 32 and first side 126 of nut 28. The gasket forms a fluid tight seal with housing 32, so that no fluid, either gas or liquid may pass around this seal and into or out of the enclosure 12.

Assembling the above parts in this manner forms an gas filter assembly that is coupled to an electrical enclosure and has a continuous, axially aligned through passageway from the interior of the enclosure to the atmosphere. It is noted that the above described passageways do not necessarily have to be any particular size or diameter and may be any size or diameter desired, as long as a continuous passageway through the gas filter assembly is formed.

Additionally, it is possible to have a gas filter assembly that does not include all of the above described members and parts. For example, filter member 20 may be fixedly attached or secured to main fitting body 22 or to fitting cap 14 using adhesive 69, and with main fitting body 22 coupled to or attached to housing 32. Filter member 20 may also be disposed or positioned between main fitting body 22 and fitting cap 14 without the use of adhesive.

Also any one of or combination of cap 14, screen 16, nylon gasket 18, bushing 19, main fitting body 22, gasket 26, and conduit nut 28 can be used or not used and in any order, as long as filter 20 is coupled to another member and/or the housing either on the exterior or the interior surfaces of the housing.

Operation

Once the gas filter assembly is assembled and installed in the enclosure 12, the enclosure is closed and secured. Under charging, or more particularly overcharging, hydrogen gas is released into the interior of the enclosure. Since hydrogen gas is lighter than air, the hydrogen gas rises to the top of the enclosure. A portion of that gas enters passageway 108 in second part 88, passes through passageway 84 in bushing 19, and through filter member 20, passageway 64 in gasket 18, and screen 16 and out of the gas filter assembly 10 through aperture 46 in fitting cap 14. This venting of hydrogen gas reduces the potential for an explosion of fire. Simultaneously, if the enclosure is exposed to water of any other liquid, the liquid that may enter aperture 46 in fitting cap 14, pass through screen 16 and gasket 18 and encounter filter member 20. Since the filter member is formed from micro porous material as described above, the water would not pass therethrough, and thus, would not damage or contaminate the interior of the electrical enclosure. Additionally, the water would not pass around the filter as it would be stopped by the seals formed by gaskets 18 and 26.

Figure 9:
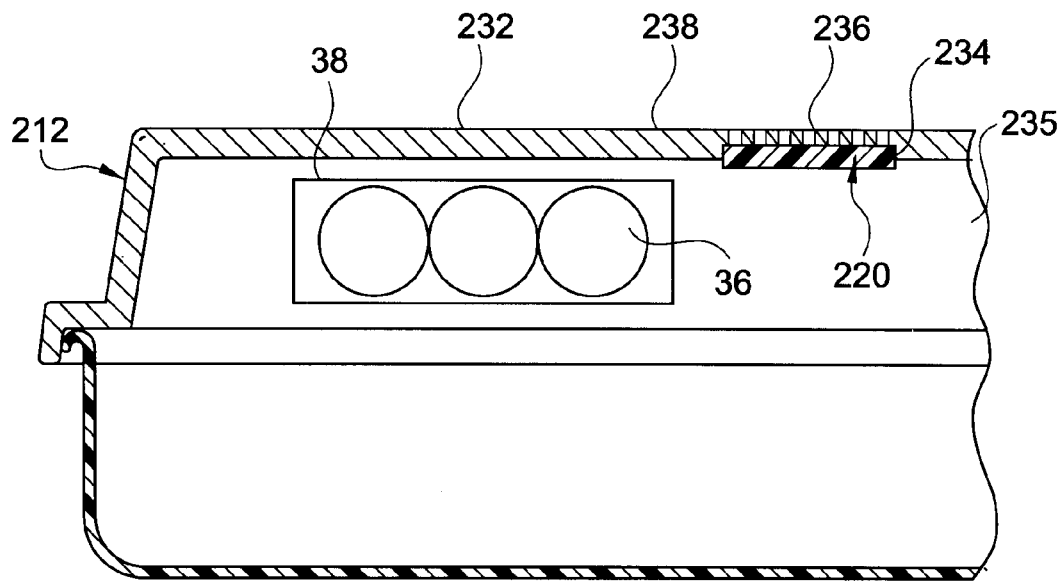
FIG. 9 is a side elevational view in section of an electrical enclosure with a gas filter assembly according to a second embodiment of the present invention.
Figure 10:
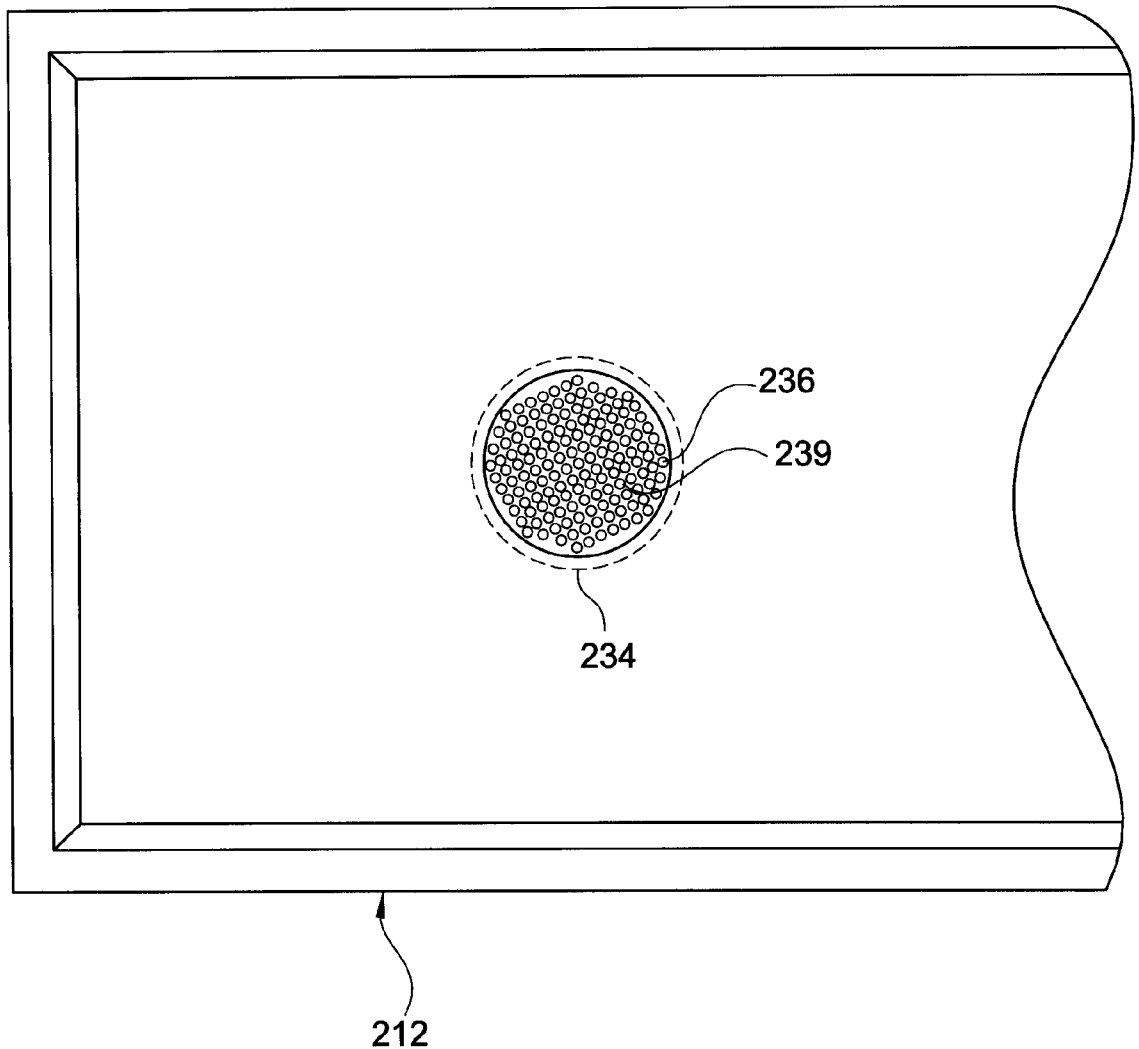
FIG. 10 is a top plan view of the electrical enclosure of FIG. 9.
Figure 11:
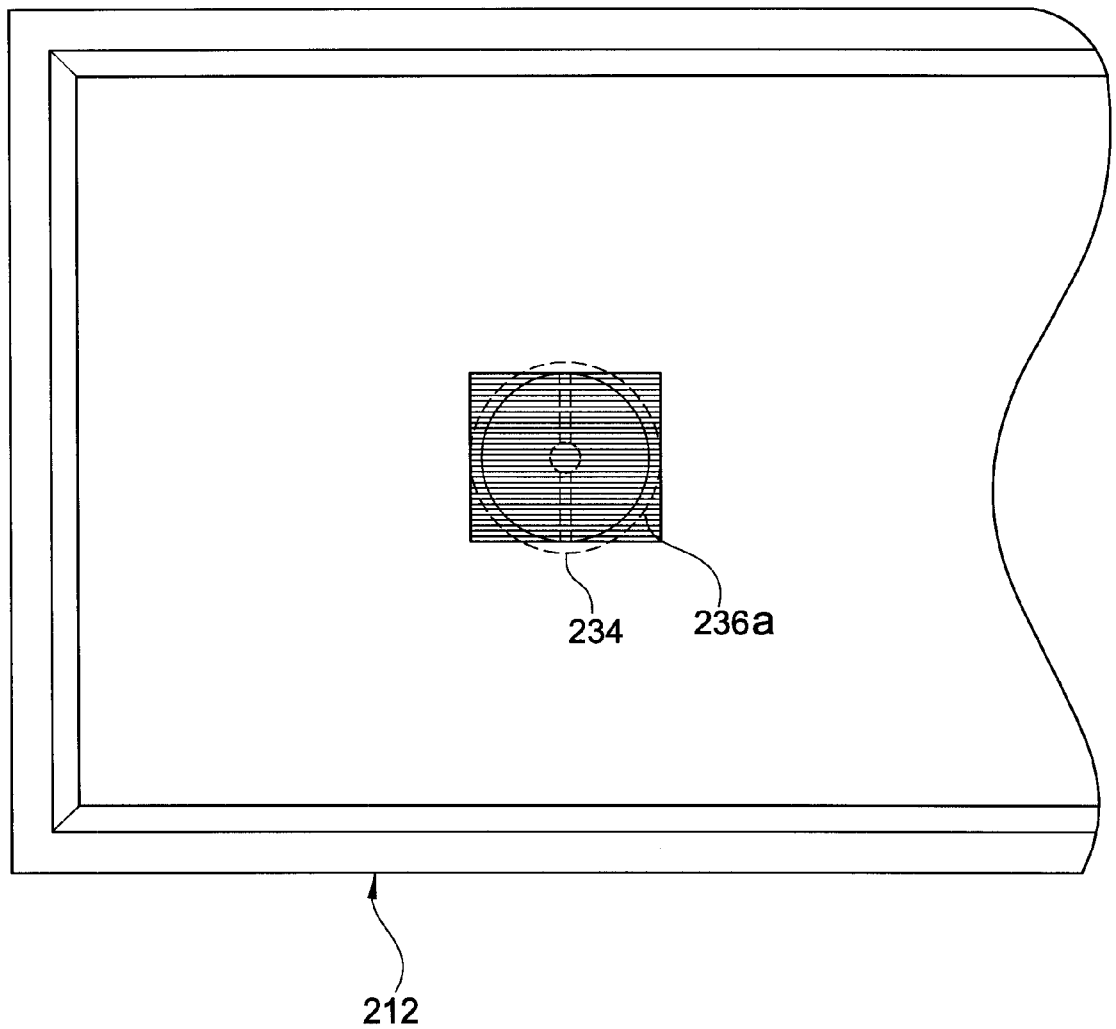
FIG. 11 is a top plan view of an electrical enclosure with a gas filter assembly according to a third embodiment of the present invention.

Embodiment of FIGS. 9–11

As seen in FIG. 9, filter member 220 may be attached directly to or adjacent the housing 232 of enclosure 212, using an adhesive substantially similar to adhesive 69. Electrical enclosure 212, filter member 220 and housing 232 are substantially similar to filter member 20, enclosure 12 and upper housing 32 and the above description thereof is applicable here.

As seen in FIGS. 9–11, the interior surface of housing 232 preferably has a cylindrical depression or recessed portion or depression 234, into which filter member 220 can be inserted. However, depression 234 may be any configuration that would allow all or substantially all of filter member to be inserted. Additionally, depression 234 may be any depth, for example the depression may be less than the height of filter member 220, as seen in FIG. 9, greater than the height of filter member 220 or substantially equal to the height of filter member 220.

Housing 232 also has an integral screen or porous portion 236 thereon that preferably extends from the atmosphere into the recessed portion, allowing access to the interior of the enclosure. Screen 236 may be any configuration of a plurality of apertures 239 or holes or it may be one aperture or hole, through the housing 232. Preferably, screen 236 is a grouping of small apertures through the housing arranged in a circle, as seen in FIGS. 9 and 10, or in any other desired configuration, or a screen 236a can also be a grating or series of rectangular apertures, as seen in FIG. 11. Additionally screen 236 may be on the top portion 238 of housing 232 or the side walls 235 or any other portion of the enclosure as desired and does not necessarily have to be located in or near recessed portion 234.

Filter member 220 preferably is applied over the screen 236 with adhesive 69 attaching to the housing 232, either in depression 234 or any other part of housing 232. Filter member 220 functions in a substantially similar manner as filter 20, allowing gases, such as hydrogen to pass therethrough, while simultaneously preventing liquids, such as water from passing therethrough.

What is claimed is:

1. A gas filter assembly, comprising:
   a fitting having a first portion, a second portion and a threaded housing coupling, said housing coupling threadably engaging an opening in a lighting fixture;
   a filter member having a peripheral portion and being positioned between said first portion and said second portion substantially on the exterior of said lighting fixture; and
   an adhesive disposed on said peripheral portion to secure said filter member to at least one of said first portion and said second portion.

2. A gas filter assembly according to claim 1, wherein said first and second portions are hollow, and define a through passageway in said fitting.
3. A gas filter assembly according to claim 1, wherein said first portion threadably engages said second portion.
4. A gas filter assembly according to claim 3, wherein said first portion has a first through passageway and said second portion has a second through passageway, said first and second through passageways being axially aligned and forming a conduit through said fitting.
5. A gas filter assembly according to claim 1, wherein said filter member has hydrophobic and oleophobic properties.
6. A gas filter assembly according to claim 5, wherein said filter member is formed from polypropylene.
7. A gas filter assembly according to claim 1, wherein said filter member forms a disc.
8. A gas filter assembly for a lighting fixture, comprising:
   a fitting having a housing coupling and a first portion threadably engaging a second portion, said first portion having a first through passageway and said second portion having a second through passageway, said first and second through passageways being axially aligned and forming a conduit through said fitting;
   a frustoconical bushing positioned within said fitting; and
   a filter having hydrophobic and oleophobic properties being positioned between said first portion and said second portion adjacent said frustoconical bushing.
9. A gas filter assembly according to claim 1, wherein the first portion threadably engages said second portion outside said lighting fixture.
10. A gas filter assembly according to claim 1, wherein said adhesive is disposed only on a peripheral portion of said filter member.

* * * * *